F. B. REDINGTON & M. J. MILMOE.
FEEDING MECHANISM.
APPLICATION FILED MAR. 22, 1913.
1,158,287.
Patented Oct. 26, 1915.
5 SHEETS—SHEET 3.
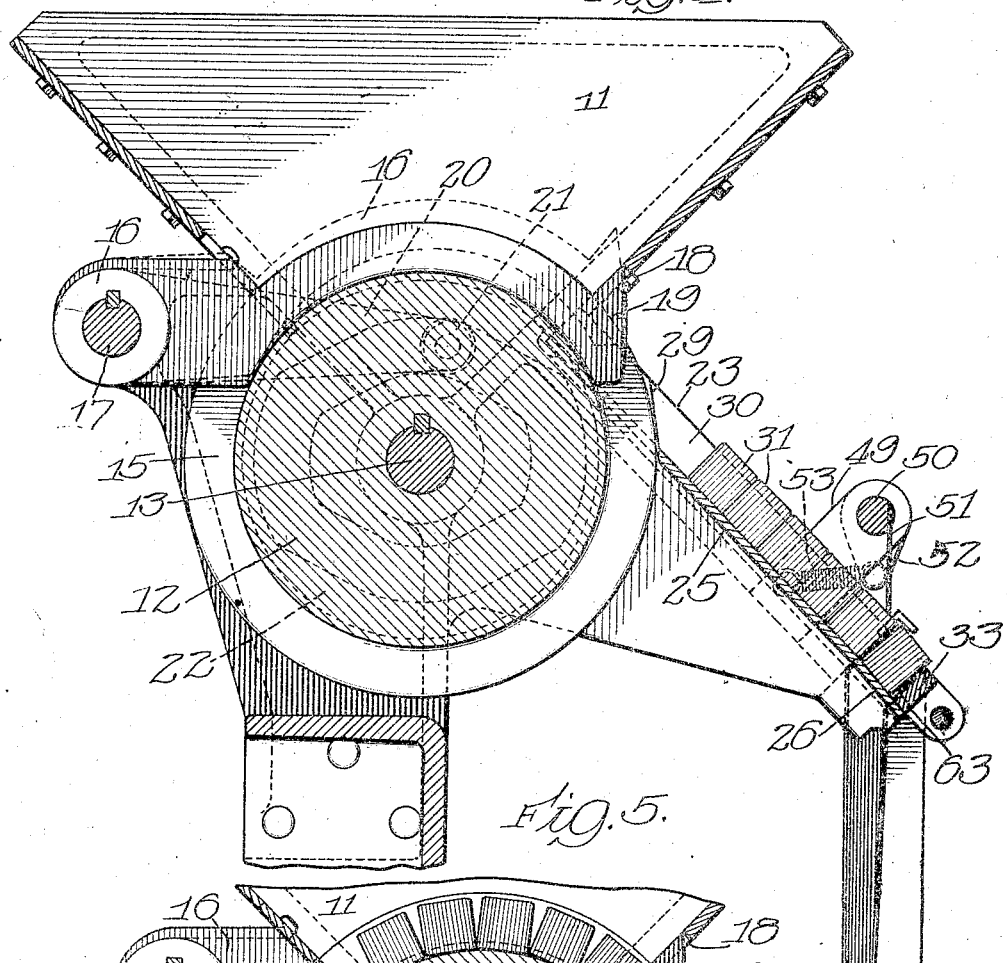
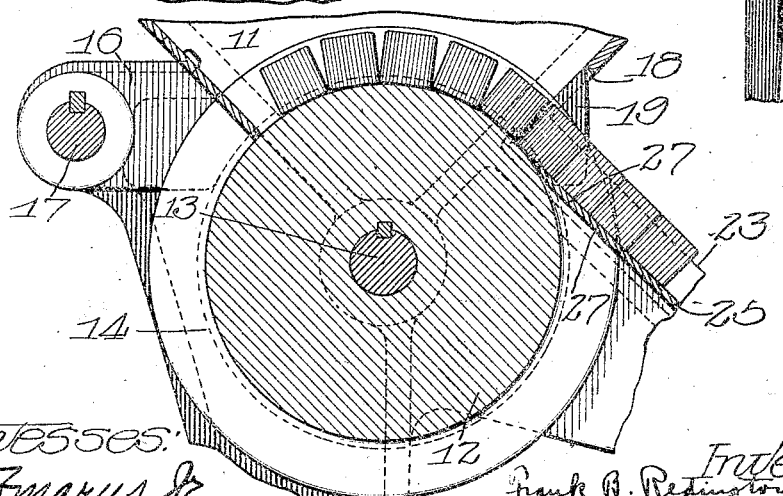
Witnesses:
G. W. Tomarus Jr.
R. Bauerle
Inventors
Frank B. Redington and
Michael J. Milmoe
By Brown Hopkins Meier & Krulla
Attys F. B. REDINGTON & M. J. MILMOE.
FEEDING MECHANISM.
APPLICATION FILED MAR. 22, 1913.
1,158,287.
Patented Oct. 26, 1915.
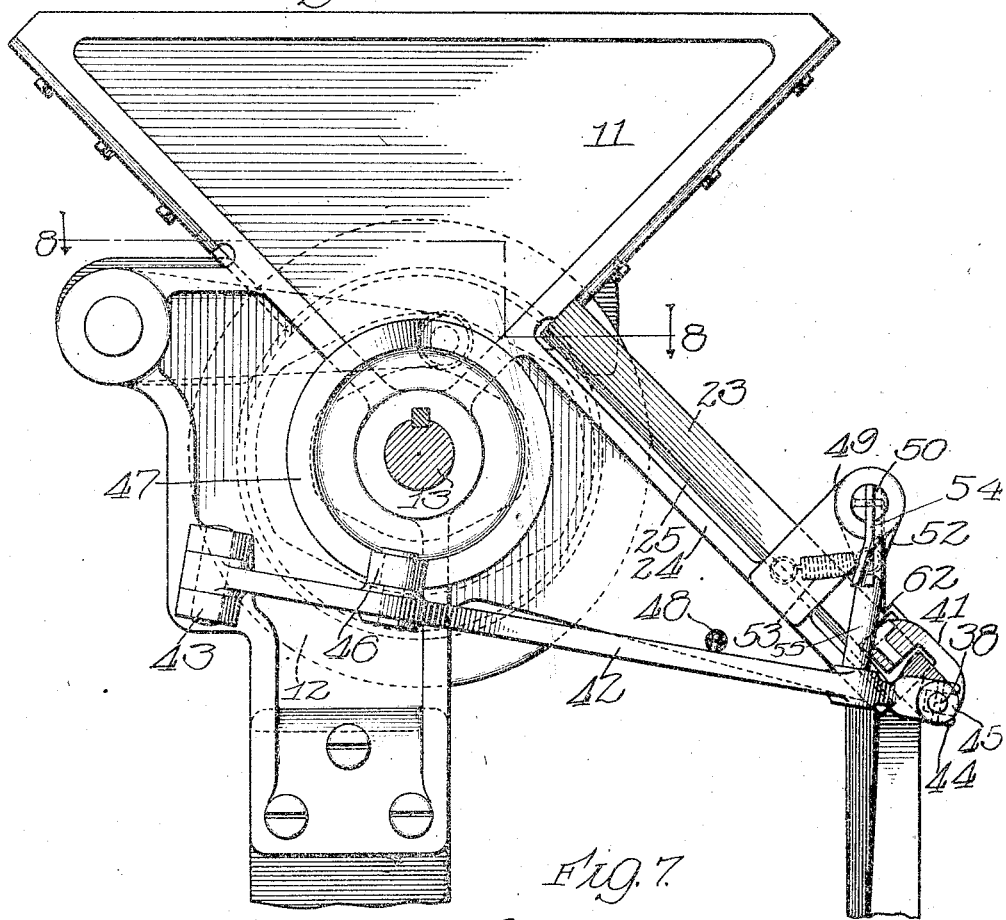
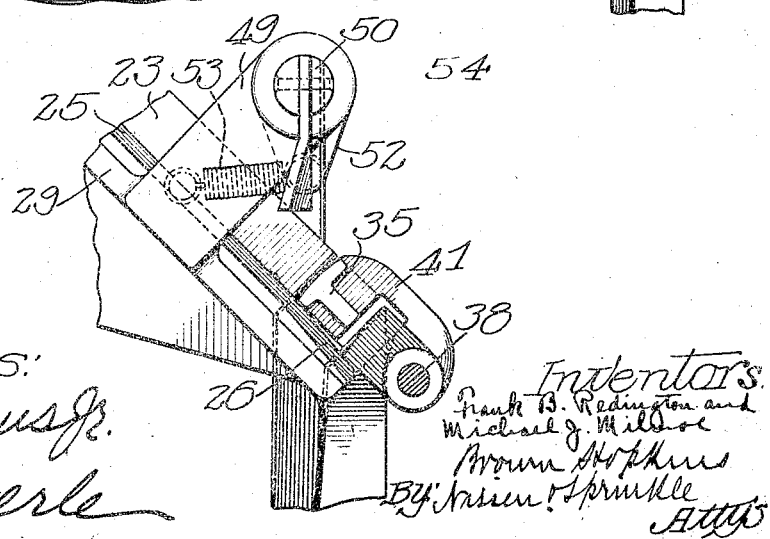

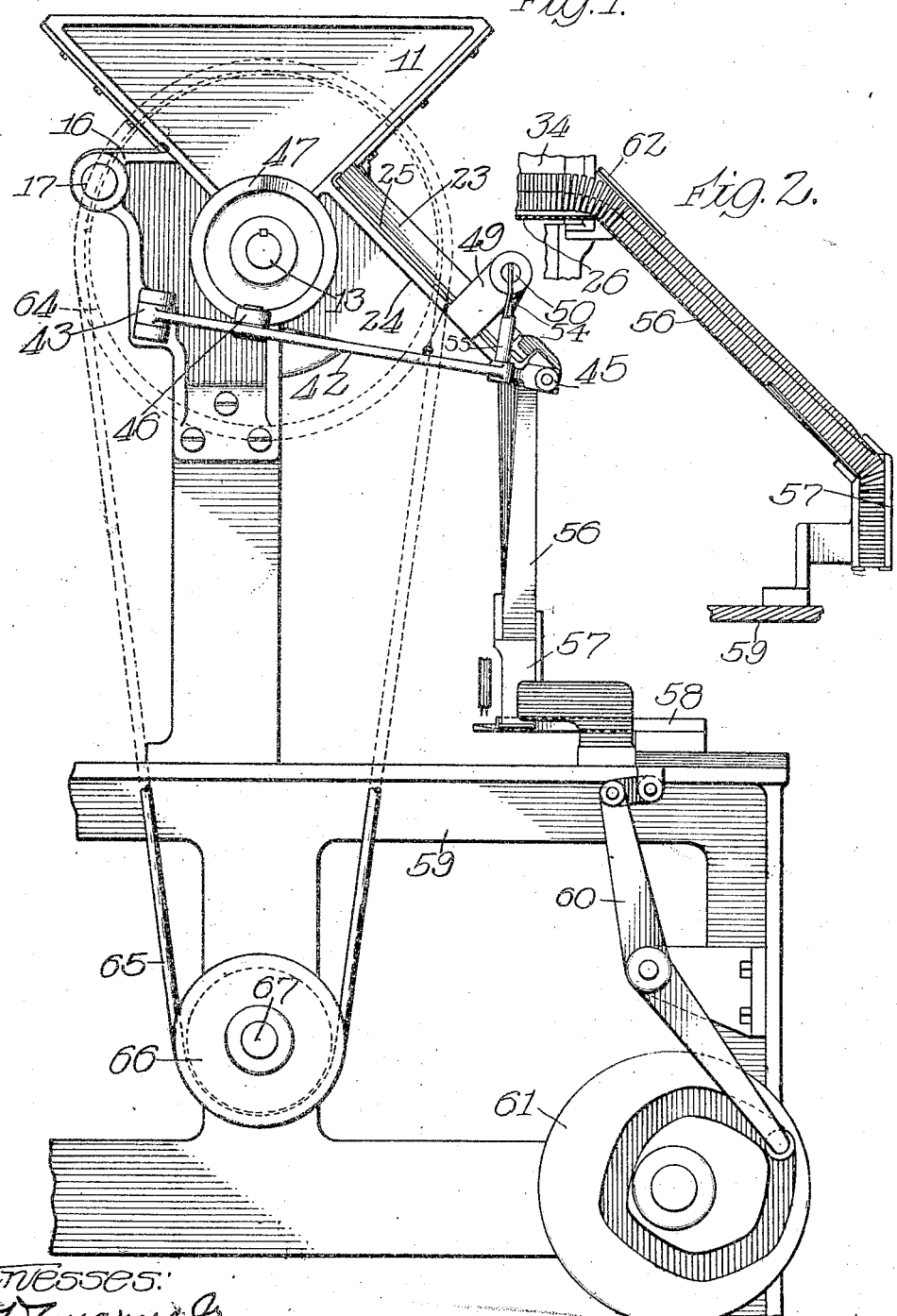

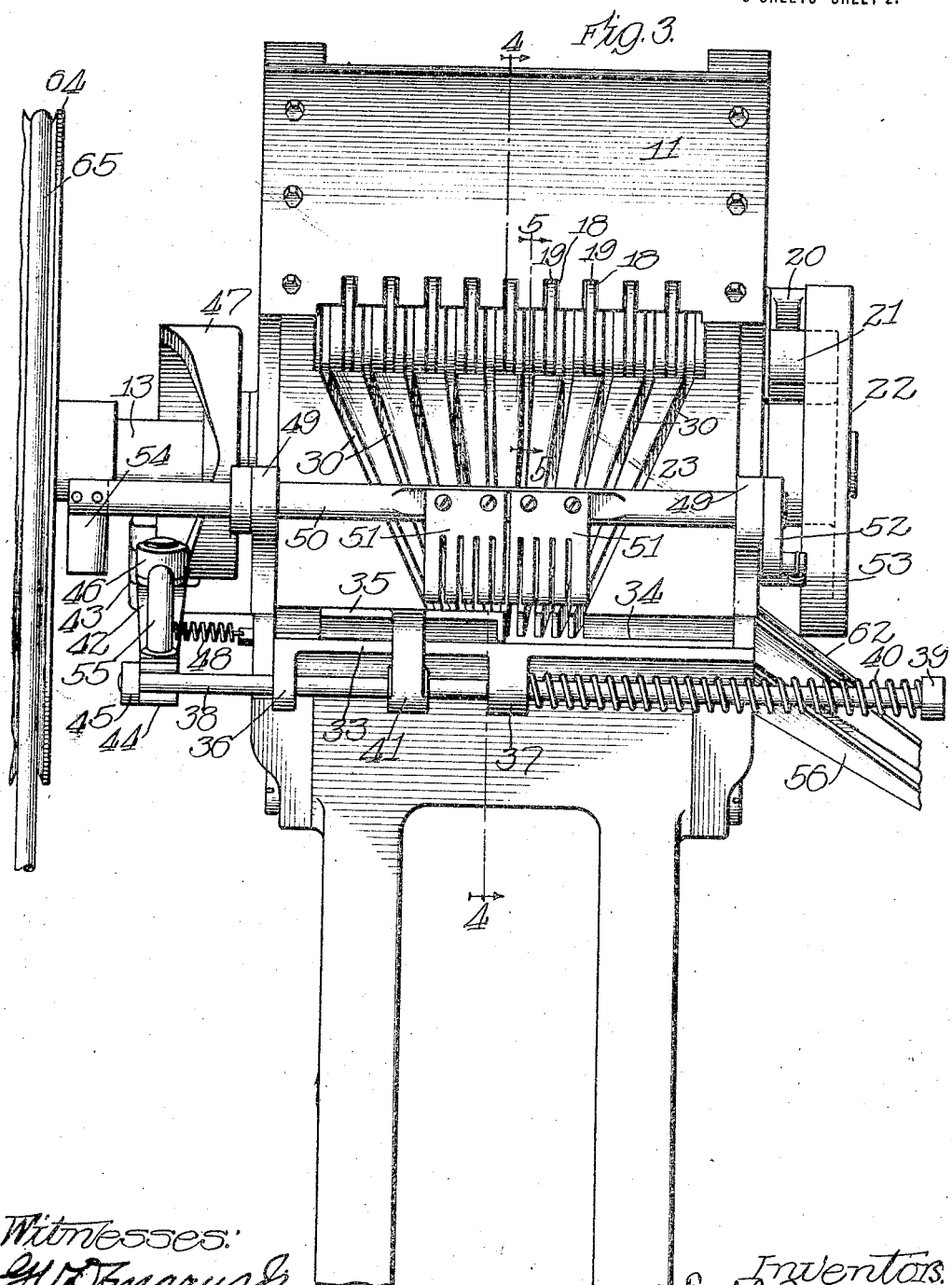

F. B. REDINGTON & M. J. MILMOE.
FEEDING MECHANISM.
APPLICATION FILED MAR. 22, 1913.
1,158,287.
Patented Oct. 26, 1915.
5 SHEETS—SHEET 5.
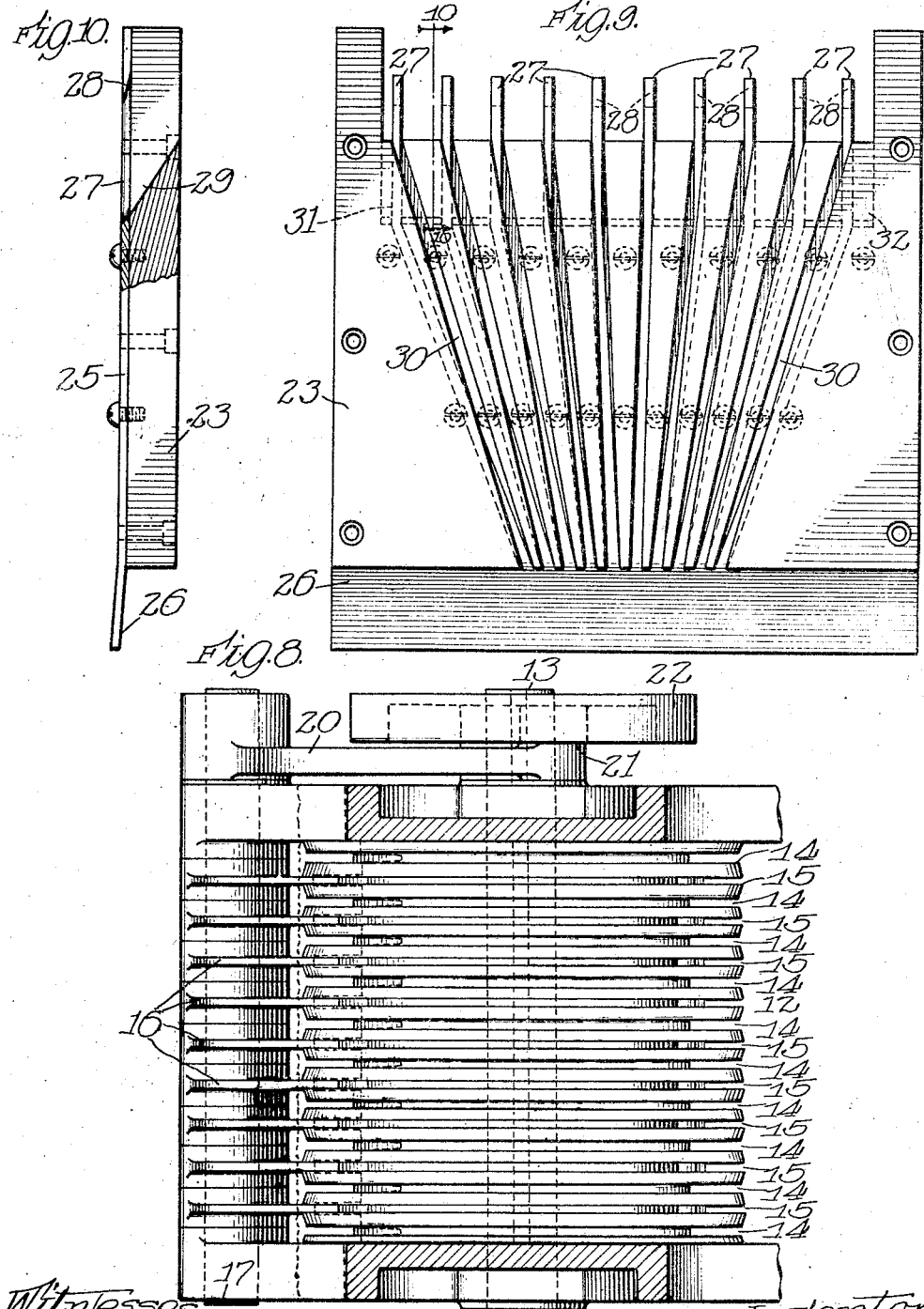

UNITED STATES PATENT OFFICE.

FRANK B. REDINGTON AND MICHAEL J. MILMOE, OF CHICAGO, ILLINOIS, ASSIGNORS TO F. B. REDINGTON COMPANY, OF CHICAGO, ILLINOIS, A CORPORATION OF ILLINOIS.

FEEDING MECHANISM.

1,158,287. Specification of Letters Patent. Patented Oct. 26, 1915.

Application filed March 22, 1913. Serial No. 756,088.

*To all whom it may concern:*

Be it known that we, FRANK B. REDINGTON and MICHAEL J. MILMOE, citizens of the United States, residing at Chicago, in the county of Cook and State of Illinois, have invented certain new and useful Improvements in Feeding Mechanism, of which the following is a specification.

This invention relates generally to wrapping machines and particularly to the feeding mechanism therefor.

Primarily, this invention is designed to feed sticks or sections of chewing gum to a wrapping machine, and has for its object to provide a mechanism whereby the gum is properly stacked prior to being received by the wrapping machine.

With the above and other objects in view, this invention consists in the construction, combination and arrangement of parts, all as hereinafter more fully described, claimed and illustrated in the accompanying drawings, wherein:—

Figure 1 is a side elevation of a feeding mechanism constructed in accordance with the present invention; Fig. 2 is a sectional view of the feeding chute and wrapping machine magazine, illustrating the stacked gum; Fig. 3 is a front elevation of the hopper and coöperating parts; Fig. 4 is a section taken along the line 4—4 of Fig. 3; Fig. 5 is a similar view taken along the line 5—5 of Fig. 3; Fig. 6 is an enlarged side elevation of the hopper and delivery plate coöperating therewith, illustrating in detail the follower operating mechanism; Fig. 7 is an enlarged side elevation of the lower end of the delivery plate, illustrating the follower for directing the assembled gum to the feeding chute; Fig. 8 is a horizontal section taken along the line 8—8 of Fig. 6; Fig. 9 is a plan view of the delivery plate; and Fig. 10 is a side elevation thereof, partly in section, along the line 10—10 of Fig. 9.

The present invention is designed to handle sections or pieces of gum approximately three-quarters of an inch square and about one-eighth of an inch thick. These sections or pieces of gum are received from the ovens in pans or receptacles not having any particular order or arrangement.

It is the object of the present invention, therefore, to provide means for receiving the pieces of gum from the pans or receptacles, and orderly arrange the same for the purpose of feeding them to the wrapping machine. This is carried out by providing a hopper 11, with a narrowed outlet opening at the base thereof.

A drum 12 is keyed to a shaft 13 arranged transversely directly under the outlet opening of the hopper 11. This drum completely fills the outlet opening of the hopper 11 and is adapted to receive the pieces of gum from the hopper and deliver the same in a vertical position to the delivery plate hereinafter more fully described. The drum 12 is provided with two series of grooves,—one series 14 for the reception of the gum; and the other series 15 acting as housings for a plurality of arms 16, keyed upon the shaft 17. These arms 16 are curved to conform with the contour of the drum 12 and normally rest within the grooves 15 bearing upon the surface of the drum.

The forward face of the hopper is provided with a series of openings 18, which coöperate with the arms 16. In order to prevent sections or pieces of the gum from passing through these openings 18, by means of the grooves 15 formed in the drum 12, each arm 16 is provided with a head 19 which fits in the adjoining or corresponding opening 18 and completely occupies the same. It will be seen by reference to Figs. 4 and 8 that the arms 16 operate in the base of the hopper, and that a continual oscillatory movement of these arms will cause an agitation among the pieces of gum contained within the hopper and will cause the same to gradually position themselves in a vertical plane, owing to the fact that the arms are spaced apart, and that, when in such position, the pieces of gum will drop between the arms 16 into the grooves 14 of the drum. It will be noted that the peripheries of the walls of the grooves 14 are beveled inwardly, to aid in the reception of the pieces of gum by said grooves from the hopper 11. In order to impart such agitation to the mass or pieces of gum contained within the hopper, the shaft 17, to which the arms 16 are keyed, is provided at its terminal with an operating arm 20, which is provided at its terminal with a transverse roller bearing 21. This roller bearing coöperates with the grooved cam 22 mounted upon the shaft 13, so that as the shaft 13 rotates a constant oscillatory movement will be imparted to the shaft 17 and thence to the arms 16, causing the required agitation of the gum within the hopper, thereby positioning the gum in a vertical plane to be received in the grooves 14 of the drum 13. As the drum is continuously rotating, it will be seen that all squares or pieces of gum placed in a vertical plane, and located adjacent to the bottom of the hopper, will be received by the grooves 14 of said drum and carried from the hopper in the direction of the arrow in Figs. 4 and 5.

After the gum is removed from the hopper by the drum 12, it is received in the delivery plate 23, shown in detail in Figs. 9 and 10, located adjacent to the forward face of the hopper 11 and arranged at an angle thereto. This delivery plate is mounted upon a frame 24 and carries on its under surface a plate 25. This plate 25 projects beyond the outer edge of the delivery plate 23 and forms the base 26 of a runway to be hereinafter more specifically described, said projecting portion or base 26 being deflected downwardly at a slight angle. The upper or inner terminal of the plate 25 terminates somewhat short of the inner end of the delivery plate 23 and is provided with a series of stripper tongues 27, which project into the grooves 14 of the drum 12, as shown in Fig. 5, said stripper tongues provided with the beveled portions 28 at their terminals for coinciding with or conforming to the contour of the drum aforesaid. It will readily be seen, by referring to Fig. 5, that as the drum rotates the stripper plates will operate under the sections or pieces of gum carried by the grooves 14 of the drum and deliver the same to the delivery plate 23. The inner terminal of the delivery plate is beveled, as shown at 29, to provide for a clearance for the drum 12, at the same time locate said delivery plate in as close proximity to the drum aforesaid as possible. This delivery plate is provided with a plurality of convergent guiding channels 30, which receive gum from the drum through the instrumentality of the stripper tongues 27 and deliver the sections of said gum in a somewhat compact correlation upon the projecting terminal 26 of the plate 25. These channels 30 at their inlet terminals—that is, the terminals thereof adjacent to the drum 12— are arranged at an angle to the plane of the plate 23, and at their outlet terminals— that is, the terminals adjacent to the projecting portion 26 of the plate 25—are arranged in a plane vertical to the plane of the plate 23. Therefore, a section or piece of gum 31 entering a channel 30 assumes an angle to the plane of the plate 23 and, as it continues to pass through the channel 30, gradually assumes a vertical position with respect to the plate 23. The base of each channel 30 terminates at the end of the plate 25, indicated by reference numeral 32 in Fig. 9, and coincides with the inner terminal of one of the stripper tongues 27, in order that a piece of gum 31 passing from the drum 12 over the stripper tongue 27 will be directed positively and accurately to the corresponding channel.

As the opening of each channel at the inlet terminal thereof coincides with the plane of the adjoining stripper tongue, and as the plate 23 is beveled, as indicated at 29, the length of the opening of each channel is greater than the length of the bottom thereof and therefore the angle of the opening to the forward edge of the delivery plate 23 will be greater than the angle of the bottom of each channel, inasmuch as at the inlet end both the opening and the bottom thereof are located in the same plane as the corresponding stripper tongue 27. By this construction, the sections of gum 31 are delivered directly into the inlet opening of each channel and gravitate toward the forward edge of the delivery plate 23 resting upon their sides, which eliminates friction and decreases the possibility of damaging the same until the sections pass from the channels at the delivery end thereof upon the projecting portion 26 of the plate 25, where they assume a vertical position and rest upon said projecting portion 26 on edge. As the channels 30 converge toward the outer edge of the plate 23 and the center thereof, it will be seen that the angle of the walls thereof to the plane of the plate 23 will be increased in proportion to the distance of the channel from the center of the plate; that is, the angle of the extreme outer channels at their inlet ends to the plane of the plate 23 will be greater than the medial or central channels 30.

The projecting terminal 26 of the plate 25 forms a runway 34 in combination with the bar 33, which is secured to the outer edge of said projecting portion 26. This runway is arranged transversely with respect to the channels 30 of the delivery plate 23, and is designed to receive the sections of gum 31 from the delivery plate in a somewhat compact form and convey the same to one side of the plate 23, as is illustrated in Fig. 3.

In order to force or carry the sections of gum 31 through the runway 34, a follower 35 is mounted for reciprocation within the runway 34 and operates against the sections of gum located within the runway as it reciprocates. The bar 33 is provided with the bearings 36 and 37, in which reciprocates a rod 38 provided at one terminal with a head 39, against which bears one terminal of a spring 40, the opposite terminal of said spring operating against the bearing 37. This spring is a compression spring, and as it operates between the bearing 37 and the head 39, normally tends to force the follower 35 in a direction toward the outlet terminal of the runway 34, said follower 35 being secured to the rod 38, which is reciprocated by the spring 40, by means of a connection 41. A lever 42 is mounted on any suitable bearing 43, for oscillation about said bearing, and has its forward end bifurcated, as at 44, for slidable engagement with the terminal of the rod 38, said bifurcated terminal 44 adapted to bear against a collar or head 45, mounted on the terminal of said rod. A roller bearing 46 is arranged medially upon the lever 42 and is adapted to bear against the outer cam surface of the cylinder cam 47, which is mounted upon the shaft 13 and is adapted to rotate therewith. It will be seen that when the roller bearing 46 contacts with the cam surface of the cylindrical cam 47, it will permit the spring 40 to act upon the rod 38 and thus force the rod and the connected follower 35 in a direction toward the outlet opening of the runway 34. This action causes the gum which may happen to be in the runway to be forced therefrom; and, after such action, the roller bearing 46 rides from the cam surface of the cylindrical cam 47, thus oscillating the arm 42 causing the bifurcated terminal 44 thereof to contact with the head 45 of the rod 38 and reciprocate said rod against the tension of the spring 40, thereby returning the follower to its normal position, leaving the channels 30 free. A spring 48 is interposed between the lever 42 and the frame 24, and normally tends to cause the roller bearing 46 to constantly contact with the cylindrical cam 47.

In order to retain the pieces or sections of gum 31 in the channels 30 while the follower 35 is operating transversely with respect to said channels and forcing the gum within the runway toward the outlet opening thereof, a pair of bearings 49 are mounted upon the frame 24 and have a shaft 50 mounted for oscillation therein, said shaft carrying detaining plates 51 medially of its ends, said plates being provided with a plurality of detents or fingers, one finger or detent being provided for each channel 30. One terminal of the shaft 50 is provided with an arm 52, to which is secured a spring 53, said spring also being secured to the frame 24 of the machine and acting upon the arm 52 to normally draw the detaining plates 51 toward the outlet ends of the channels 30 to operate against the gum passing through said channels to retain the same therein until the follower has completed one full reciprocation.

At the opposite end of the shaft 50 to the arm 52 is a dependent cam plate 54, which coöperates with a pin 55 mounted on the lever 42. Therefore, as the cam 47 returns the follower, through the instrumentality of the lever 42 and the rod 38, to its normal position to permit the passage of gum from the channels 30 to the runway 34, the pin 55 contacts with the cam plate 54 to oscillate the shaft 50 against the action of the spring 53, thereby raising the detaining plates 51 and permitting the gum free passage through the channels 30, as indicated in Fig. 4. So long as the pin 55 is in contact with the cam plate 54, the gum may freely pass through the channels 30; but as soon as the roller bearing 46 operates upon the cam surface of the cam 47 and the spring 40 operates the follower, the lever 42 will move away from the cam plate 54, thus disengaging the pin 55 therefrom, thereby permitting the spring 53 to act upon the arm 52 and the detaining plates 51 to drop retaining the gum within the channels 40.

The action of the follower 35 forces the gum from the runway 34 into an inclined feeding chute 56, which opens at its lower end into the magazine 57 of the wrapping machine. A slide 58 is mounted upon the table 59 under the magazine 57, and is operated by a bell crank 60, which is oscillated by a cam 61. As the cam 61 rotates, the bell crank 60 is oscillated, imparting a reciprocatory movement to the slide 58, which slide engages the lowest section of gum 31 within the magazine 57 and removes the same therefrom, after which it carries the said section to the wrapping machine, not shown or described in this application.

It will be understood that when pressure is applied to a series of sections or pieces of gum at both terminals thereof, the tendency of said gum is to rise, or buckle, in the middle; and in order to eliminate this tendency an angle plate 62 is mounted upon the feeding chute 56 adjacent to the outlet terminal of the runway 34, and acts upon the upper edges of the sections of gum to guide the same and to overcome this buckling or rising tendency thereof.

In passing from the channels 30 to the runway 34 in which the sections or pieces of gum rest on edge, there is a tendency for the gum to fall upon the side rather than rest upon edge, and to overcome this tendency and to suspend the gum from two points located upon adjacent edges thereof, the bar or plate 33, forming one side of the runway 34, is beveled inwardly, as at 63, toward the bottom of said runway. Thus, as the sections of gum pass from the channels 30 to said runway, the outer edge of each section is supported by the upper edge of the bar 33 and the bottom edge is supported adjacent to the bend of the projecting portion 26 of the plate 25, thereby supporting each section at two points and overcoming the tendency of the gum to fall upon its face. The shaft 13 which operates the entire feeding machine is driven by the sheave 64, over which operates a belt 65, which is driven from a pulley 66 located upon a suitable power shaft 67.

Briefly, the operation of this feeding mechanism or machine is as follows: The shaft 13 is constantly rotating and this constant rotation of said shaft imparts an oscillatory movement to the agitating arm 16, through the medium of the groove cam 22, thereby causing the pieces or sections of gum in the bottom of the hopper 11 to gradually assume a vertical position and drop into the grooves 14 of the drum 12. As soon as the pieces of gum drop into the grooves 14 in a vertical position, namely, upon edge, the rotation of the drum carries such sections or pieces of gum from the hopper to the channels 30, through which the gum gravitates. A continued rotation of the shaft 13 causes the roller bearing 46 to ride upon the cam surface of the cam 47, thus permitting the spring 40 to act upon the rod 38 and cause the follower to reciprocate. This reciprocation of the follower engages all gum which has been delivered by the channels 30 to the runway 34, to be moved along the said runway to the feeding chute 56, through which said gum passes by the action of gravity. This movement of the follower causes the detainer plates 51 to drop, by the action of the spring 53, thereby preventing any further gum passing into the runway 34 until the follower has returned to its initial position to engage the gum next delivered to the runway.

Having thus fully described our invention, what we claim as new and desire to secure by United States Letters Patent is:

1. The combination with a hopper, of a grooved rotary drum coöperating therewith adapted to receive sections of material from said hopper in edgewise relation, a delivery plate coöperating with said drum to receive said sections in edgewise relation from said drum and arrange the same in a given order, and a feeding chute coöperatively arranged in connection with said delivery plate for receiving said sections of material in arranged position.

2. The combination with a hopper, of a drum coöperating therewith and having a plurality of peripheral grooves, a delivery plate having a plurality of guiding grooves alined with said drum grooves, and a feeding chute coöperatively arranged in connection with said delivery plate.

3. The combination with a hopper adapted to contain rectangular sections of material, means for agitating said sections of material in the hopper, a grooved rotary drum for arranging the same on edge, and means for receiving said sections of material from said drum and stacking the same.

4. The combination with a hopper adapted to contain rectangular blocks of material, of vertically reciprocating means within said hopper for agitating the contents thereof gradually arranging said blocks upon edge.

5. The combination with a hopper adapted to contain blocks of material, of an agitator directly engaging the blocks within said hopper for arranging the contents thereof successively upon edge, and a drum for receiving the blocks after being operated upon by the agitator and removing the same from the hopper aforesaid.

6. The combination with a hopper adapted to contain blocks of material in indiscriminate relation, of an agitator directly engaging said blocks within said hopper for arranging the contents thereof successively upon edge, a drum for receiving the blocks after being operated upon by the agitator and removing the same from the hopper aforesaid, and means coöperating with said drum for receiving said blocks therefrom and stacking the same in definite fixed correlation.

7. The combination with a hopper, of a delivery plate arranged adjacent thereto, an agitator within the hopper, a rotary drum for justifying and conveying the contents of said hopper to said delivery plate, and means arranged upon said delivery plate for stacking and arranging said contents.

8. The combination with a hopper, of a delivery plate arranged adjacent thereto adapted to receive the contents of said hopper and arrange the same, a runway coöperating with said delivery plate for receiving said arranged contents, a feeding chute coöperating with said runway and means for reciprocating said follower at predetermined intervals for receiving the arranged contents, and a reciprocating follower operating in said runway for clearing the runway.

9. The combination with a hopper, of a circumferentially grooved drum coöperating therewith, and a delivery plate coöperating with said drum provided with grooves alined with the grooves of said drum.

10. The combination with a hopper, of a grooved drum coöperating therewith, and a delivery plate coöperating with said drum provided with convergent grooves alined at one terminal with the grooves of said drum.

11. The combination with a hopper, of a delivery plate coöperating therewith adapted to receive from said hopper the contents thereof, and to stack and arrange the same, a runway coöperating with said delivery plate, and a follower mounted for reciprocation in said runway transversely of said delivery plate for removing the stacked contents thereof and means for reciprocating said follower at predetermined intervals.

12. The combination with a hopper, of a drum coöperating therewith, a delivery plate coöperating with said drum, a runway located adjacent to said delivery plate, a follower reciprocating in said runway and operable by the revolutions of said drum, and a feeding chute adapted to receive the contents of said runway by the action of said follower.

13. The combination with a hopper, of a grooved drum coöperating therewith, a delivery plate coöperating with said drum provided with channels alined at one terminal with the grooves of said drum, a runway adapted to receive the contents of said channels, a chute located at one terminal of said runway, and a follower adapted to empty said runway into said chute.

14. The combination with a hopper, a grooved drum coöperating therewith, a delivery plate adjacent to said drum provided with channels, a runway adapted to receive the contents of said channels, a follower operable transversely of said channels for emptying said runway, and means for closing the channels aforesaid during the operation of said follower.

15. The combination with a hopper, of a circumferentially grooved drum coöperating therewith, a delivery plate adjacent to said drum provided with channels alined with the grooves in said drum, a runway adapted to receive the contents of said channels, a follower operable from said drum for emptying said runway, and detaining plates adapted to coöperate with said channel for stopping the passage therethrough during the operation of said follower.

16. The combination of a hopper adapted to contain a quantity of pieces of material in indiscriminate relation, a drum having a plurality of peripheral grooves, and an agitator acting directly upon the quantity of pieces of material and coöperating with the drum to position the pieces of material in edgewise relation in said grooves.

17. The combination of a hopper adapted to contain a quantity of pieces of material in indiscriminate relation, a drum having a plurality of peripheral grooves, an agitator acting directly upon the quantity of pieces of material and coöperating with the drum to position the pieces of material in edgewise relation in said grooves, and a guiding plate having a plurality of grooves positioned to receive the pieces of material from the grooves of said drum.

18. The combination of a hopper adapted to contain a quantity of pieces of material in indiscriminate relation, a drum having a plurality of peripheral grooves, an agitator acting directly upon the quantity of pieces of material and coöperating with the drum to position the pieces of material in edgewise relation in said grooves, a guiding plate having a plurality of grooves positioned to receive the pieces of material from the grooves of said drum and for directing the pieces of material into stacked relation, means for receiving the material from the guide plate, and an ejector for removing the stacked pieces of material from the last said means.

19. The combination of a hopper for containing a quantity of pieces of material in indiscriminate relation, a rotary drum upon which said quantity of pieces rests and having a plurality of circumferential grooves, a plurality of agitator arms positioned between the grooves and coöperating therewith to position the pieces of material in the grooves, guiding means having a plurality of channels positioned to receive the pieces of material from the drum and direct them into stacked relation, and a receiver for receiving the stacked pieces of material from said channels.

20. The combination of a hopper for containing a quantity of pieces of material in indiscriminate relation, a rotary drum upon which said quantity of pieces rests and having a plurality of circumferential grooves, a plurality of agitator arms positioned between the grooves and coöperating therewith to position the pieces of material in the grooves, guiding means having a plurality of channels positioned to receive the pieces of material from the drum and direct them into stacked relation, a receiver for receiving the stacked pieces of material from said channels, and an ejector operating transversely of said channels within said receiver for removing the stacks of pieces of material.

21. The combination of a hopper for containing a quantity of pieces of material in indiscriminate relation, a rotary drum upon which said quantity of pieces rests and having a plurality of circumferential grooves, a plurality of agitator arms positioned between the grooves and coöperating therewith to position the pieces of material in the grooves, guiding means having a plurality of channels positioned to receive the pieces of material from the drum and direct them into stacked relation, a receiver for receiving the stacked pieces of material from said channels, an ejector operating transversely of said channels within said receiver for removing the stacks of pieces of material, and means for withholding the following pieces of material in the channels while a stack of pieces is being ejected.

22. The combination of a hopper for containing a quantity of pieces of material in indiscriminate relation, and a rotary drum having a plurality of beveled wall grooves for arranging the pieces of material within the grooves.

23. The combination of a hopper for containing a quantity of pieces of material in indiscriminate relation, a rotary drum having a plurality of beveled wall grooves for arranging the pieces of material within the grooves, and a plurality of oscillatory agitator arms positioned between the grooves of said drum and coöperating therewith to position the pieces of material in said grooves.

24. The combination of a hopper for containing a quantity of pieces of material in indiscriminate relation, a rotary drum having a plurality of beveled wall grooves for arranging the pieces of material within the grooves, a plurality of oscillatory agitator arms positioned between the grooves of said drum and coöperating therewith to position the pieces of material in said grooves, and a guiding plate having a plurality of channels, one terminal of which is positioned to receive the pieces from said grooves and the other terminals of which are arranged in closely spaced relation to direct the pieces into stacked relation.

25. The combination of a hopper for containing a quantity of pieces of material in indiscriminate relation, a rotary drum having a plurality of beveled wall grooves for arranging the pieces of material within the grooves, a plurality of oscillatory agitator arms positioned between the grooves of said drum and coöperating therewith to position the pieces of material in said grooves, a guiding plate having a plurality of channels, one terminal of which is positioned to receive the pieces from said grooves and the other terminals of which are arranged in closely spaced relation to direct the pieces into stacked relation, a trough for receiving the stacked pieces of material, and means for ejecting the stack of pieces.

26. The combination of means for arranging and feeding pieces of material in edgewise relation, delivery means for receiving and delivering said pieces on edge in stacked relation, and means for supporting the pieces of material in the stack at points on two adjacent edges thereof above the center of said edges to prevent them from tipping.

27. The combination of means for arranging and feeding pieces of material in edgewise relation, delivery means for receiving and delivering said pieces on edge in stacked relation, and a trough for supporting the individual pieces in the stack at two points beyond the center of gravity of said pieces measured in lines perpendicular to the base line of said pieces to prevent them from tipping.

28. The combination of means for arranging and feeding pieces of material in edgewise relation, delivery means for receiving and delivering said pieces on edge in stacked relation, a trough for supporting the individual pieces in the stack at two points beyond the center of gravity of said pieces in lines perpendicular to the base lines of said pieces to prevent them from tipping, and an ejector for removing the stack of pieces.

29. In combination, means for feeding pieces of material in edgewise relation and receiving means adapted to contact with a point above the center of each of two edges of said pieces and with one or more additional points.

30. In combination, means for feeding pieces of material in edgewise relation and means for receiving said pieces of material and supporting them along one edge thereof and at a point above the center of an adjacent edge, the lower portion of said adjacent edge being unsupported.

31. The combination of means for feeding pieces of material in edgewise relation, and a device for supporting said material arranged to contact with the pieces at points on two adjacent edges thereof above the center of said edges and at one or more additional points.

32. The combination of means for feeding pieces of material in edgewise relation, delivery means for receiving and delivering said pieces on edge in stacked relation, and means for supporting the pieces of material in the stack at points on two adjacent edges thereof above the centers of said edges and at one or more additional points, to prevent them from tipping.

33. The combination of means for feeding pieces of material in edgewise relation, and a receiving trough for said pieces having two adjacent sides arranged to support adjacent edges of said material, the angle between the adjacent sides of said trough being less than the angle between the supported edges of said pieces.

34. The combination of means for feeding pieces of material in edgewise relation, of a receiver for said pieces, comprising two plates arranged at an angle to one another and adapted to support adjacent edges of said pieces, the angle between said plates being less than the angle between the supported edges of said pieces.

35. The combination of means for arranging and fitting pieces of material in edgewise relation, delivery means for receiving and delivering said pieces on edge in stacked relation, and means for supporting the pieces of material in the stack at points on two adjacent edges thereof above the center of said edges, the portion of the wafers below the center of one edge thereof being unsupported.

In testimony whereof we have signed our names to this specification, in the presence of two subscribing witnesses, on this 18 day of March A. D. 1913.

FRANK B. REDINGTON.
MICHAEL J. MILMOE.

Witnesses:
 FRED G. BROOKS,
 HELEN M. PATTERSON.